No. 690,958. Patented Jan. 14, 1902.
R. M. HUNTER.
METHOD OF ELECTRIC WELDING.
(Application filed Apr. 7, 1898.)
(No Model.)
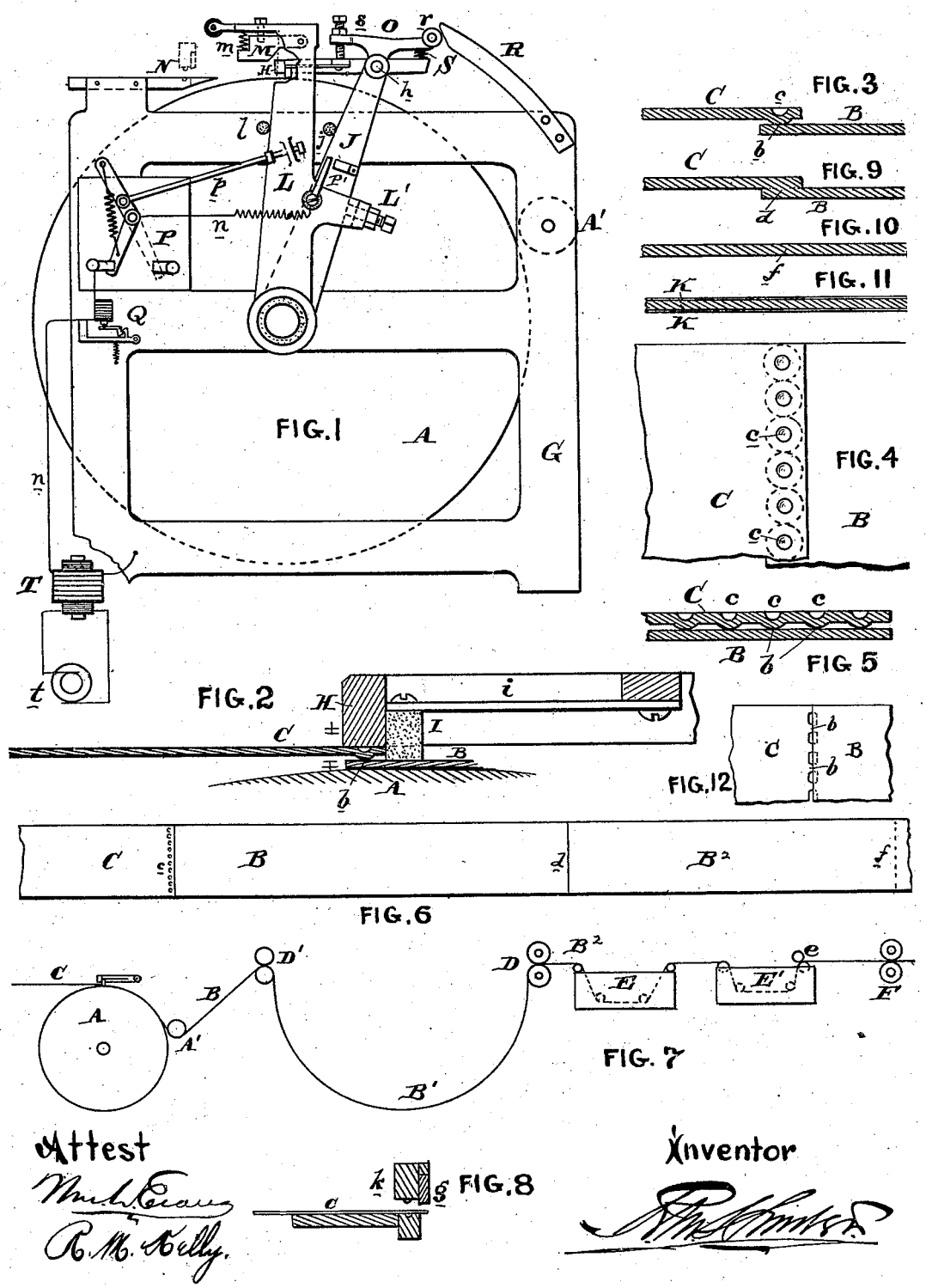

UNITED STATES PATENT OFFICE.

RUDOLPH M. HUNTER, OF PHILADELPHIA, PENNSYLVANIA.

METHOD OF ELECTRIC WELDING.

SPECIFICATION forming part of Letters Patent No. 690,958, dated January 14, 1902.

Application filed April 7, 1898. Serial No. 676,756. (No model.)

*To all whom it may concern:*

Be it known that I, RUDOLPH M. HUNTER, of the city and county of Philadelphia, State of Pennsylvania, have invented an Improvement in Methods of Electric Welding, of which the following is a specification.

My invention set out in this application (Case 304) has reference to the manufacture of sheet metal in long lengths by electric welding; and it consists of certain improvements which are fully set forth in the following specification and shown in the accompanying drawings, which form a part thereof.

Heretofore it has been customary to make long lengths of sheet-tin for roofing by connecting the smaller sheets end to end by folded joints; but this has objection from the fact that it forms a heavy seam and is not always proof against leakage. Furthermore, sheets of metal of this character cannot be employed in such industries as the manufacture of sheet-metal cans, pans, &c.

The object of my invention is to provide a method of making continuous lengths of sheet metal, plain, tinned, or coated, and adapted for roofing and general manufactures, the said sheets being without seams and liquid-tight throughout.

In carrying my invention into practice I first manufacture a series of sheets of iron or steel of the requisite width, and these I arrange, two or more, end to end and unite them by electric welding. The welded joints may be subsequently run through cold-plate rolls and the said welded joints rolled down to the same thickness as the rest of the sheet-plate. This sheet metal may then be coated or tinned and finally passed between planishing-rolls, if so desired. The welding of the sheets of iron or steel together is an important feature of my invention, and in carrying out this part of my improvements I provide one end of the sheets with a series of projections, which may be formed by dies and arranged in a transverse line at or adjacent to one end of the plate. When these projections are placed upon or in contact with the other end of the next adjacent sheet, we will have an electrical contact made between the two plates or sheets at a series of separate and preferably equidistant points and adapted for offering a very material resistance. When these plates are pressed into contact and a current of electricity passed from one plate to the other, the welding operation begins at each of the points of contact, and as the metal in the immediate vicinity of the projections on the two plates melts small lakes of molten metal are formed, which quickly spread and unite, making a full transverse weld. Under ordinary conditions of simply lapping the edges and passing a current through from plate to plate the welding would be a failure, since it is impossible to properly control the action of the current and portions would melt and flow away before other parts are welded at all. By my improved method, however, I set up a simultaneous series of gradually-extending welds, which ultimately unite, and thus make it possible to properly unite the two sheets. When the weld is being made, the plates are pressed together as the metal becomes fused. Broadly considered, my invention comprehends the union of two sheets of metal in this manner irrespective of the purposes to which it may subsequently be put.

My invention will be better understood by reference to the accompanying drawings, in which—

Figure 1 is a side elevation of a sheet-metal-welding machine embodying my invention. Fig. 2 is an enlarged sectional elevation of a portion of same. Fig. 3 is a longitudinal section of the lapped sheets before welding. Fig. 4 is a plan view of a portion of same. Fig. 5 is a cross-section of same on the line of the projections. Fig. 6 is a plan view of a long sheet in process of being made by my process. Fig. 7 is an elevation showing my complete apparatus for welding, rolling, and coating diagrammatically. Fig. 8 is a sectional elevation of a apparatus for preparing the ends of the sheets before being welded. Fig. 9 is a longitudinal section of the welded sheets. Fig. 10 is a similar view of the joint after cold-rolling. Fig. 11 is a similar view after the plate has been coated or tinned, and Fig. 12 is a plan view of a modified form of plate-joint for welding.

A is the welding-machine for uniting the sheet C to the rear end of the sheet B. The long length of sheet metal comprises the portion B', which is fed in the form of a loop by feed-rolls D' and has its joints welded, as indicated at $d$ in Fig. 9, and the portion B², which has passed through the cold-press rolls D and has its joints reduced to the condition of $f$, Fig. 10, having a uniform thickness with the rest of the sheet. The sheet so prepared may then be coated or plated in any suitable or well-known manner. In Fig. 7 I have shown it as being fed through a bath E of acid to cleanse it and thence through the tinning or galvanizing bath E'. The excess of the coating metal is rubbed off by the rolls $e$, and after cooling it may pass through planishing-rolls F. It is evident that the bath E' may be an ordinary copper-plating bath, if so desired, as will be well understood. The loop B' enables the sheet to be continuously drawn through the press-rolls D and permits the intermittent action of the welding-machine. The rolls D' act as a support arranged in alinement with the face of the horizontal press-rolls D and intermediate of said rolls and the welding means. The loop B' compensates for any variation in the length of the sheet between the welding-machine and press-rolls. It also secures a regular and uniform action in the baths E E'. The coating material, whether it be paint, size, tin, or copper, is indicated in Fig. 11 at K.

I will now describe the welding mechanism. The cylinder A is journaled in a main frame G, and the new sheets to be added are guided by a table N and fed under the clamp H. The clamp H is pivoted at $h$ to an arm J, which is in turn pivoted concentrically with the axis of the cylinder A.

I is a block of slate carried on a spring-arm $i$, secured to the clamp H and is adapted to normally be held down below the clamp, so as to act as a stop or guide to receive the end of the metal sheet C to be welded and at the same time hold down the rear end of the previous sheet B. Pivoted at $h$ on the end of the arm J is a head O, having a rear arm provided with a roller $r$, adapted to run under the guide R on the main frame, and a forward arm furnished with a set-screw $s$ to limit the upward movement of the clamp H. A spring S is interposed between the rear end of the clamp H and the head O under the roller $r$ and operates to throw up the clamp and guide on the return stroke and also to make the roller $r$ follow the cam R.

L is a second pivoted arm, having its pivot concentric with the arm J and cylinder A. This arm L is adapted to be rocked or reciprocated by hand. It is provided with a stop L', which acts upon the arm J, so that when the arm L is pulled back it draws the arm J with it.

M is a cam pivoted to the arm L and is pressed downward by a spring $m$. In the positions shown in Fig. 1 a stop $j$ acts to limit the movement of arm J, and a stop $l$ may be used to limit the arm L, though this is hardly necessary in view of the use of the stop L'. The parts J, L, and R are insulated from the main frame.

P is a snap-switch for opening the electric circuit and is operated by a rod $p$, connecting with the arm L. This snap-switch consists of two arms pivoted together and having their free ends connected by a spring. One of the arms is connected with the rod $p$, and the other acts as the circuit-closing contact. When the arm L is moved to the right, the rod $p$ is moved to the right until the spring passes beyond the pivot of these arms, when the spring snaps the lower arm over into the dotted position to open the circuit. In closing the circuit the reverse operation occurs.

P' is a circuit-closing switch, part being on arm J and part on arm L.

The electric current from an alternating-current dynamo $t$ is transformed by a transformer or induction-coil T into a current of very low tension and great volume, and this is delivered to the main frame G or cylinder A and to the arm J by switch P' and circuit $n$, including the switch P.

The forward ends of the sheets C are prepared in the following manner: The edge is trimmed by shear $g$, and the surface near that edge is formed with a series of projections $b$ on one side and depressions $c$ on the other, as shown by dies $k$, Fig. 8, or in any other suitable manner. When this end of the sheet C is placed upon the rear end of plate B, we have the construction shown in Figs. 2, 3, and 5. It is evident that the die and shear shown in Fig. 8 may be arranged at N, Fig. 1, in proper position to secure the proper feeding of the sheet.

The operation of the welding-machine will now be understood. The parts being in the positions shown in Fig. 1, the sheet C is thrust in upon the end of the sheet B. The arm L is then moved to the right, causing the cam M to ride over the clamp H and press it firmly down upon the plate C with an elastic pressure. The parts are then in the position shown in Fig. 2. In coming to this position the arm L moves the switch P' to close the secondary circuit $n$, causing the electric current to pass between H and A and between the plates B C by contacts $b$. As the arm L is moved farther to the right its upper part strikes the forward part of the head O and moves the arm J backward. The roller $r$ passes under the cam R, compressing the spring S and raising stop $s$. When the welding is completed, the arm L opens the snap-switch P and is then moved to the left. This action releases the clamp H from the cam M, and under the effect of the spring S the clamp H is moved away from the cylinder A. At this time the weld is as shown in Fig. 9. The clamp has raised sufficiently to clear the guide-stop I of the forward edge of sheet C. The movement of the arm L to the left moves the arm J with it through part L', and the several portions of the apparatus return to the positions shown in Fig. 1. The sheet B, with the addition C, is then moved under roller A' and through feed-rollers D', and the operation is repeated with a new sheet. When the arm L first moved to the right to operate the clamp H by the cam M, it immediately closed the switch P' and put on the current. When a small movement to the right of both arms L and J was made, the switch P automatically snapped open to break the current to stop the welding. In the reverse movement the arm L opens the switch P' and subsequently closes the switch P to bring them into position for a new operation. As the welding operation takes place the pressure of the spring m causes the clamp H to force the plates C B together as the projections b become fused into the surface of the plate B.

An overload-switch Q may be employed to automatically open the circuit when the maximum current flows, so as to prevent any possibility of the lapped body portion of the sheets becoming melted or fusing. The transformer T may be operated on constant-potential mains and have a maximum capacity which may accord with the capacity of the switch Q. This switch Q operates to open the secondary circuit n when a sufficiently large current passes through it, said current being dependent upon the resistance presented by the lapped sheets through which the current must pass. As the welding progresses the resistance of the joint decreases and more current flows in the circuit n. When this current reaches a maximum, the magnet of the switch Q operates its armature and releases the spring-actuated circuit-closing switch. This prevents abnormal fusing at the welded joint.

It is to be understood that in carrying out this welding operation my invention comprehends the same method whether the points of contact are upon the sides or edges or upon both plates, as the invention comprehends, broadly, the preliminary forming of points or surfaces of contact of less area than the whole surface to be welded and securing the welding operation by causing them to become fused as a preliminary operation to the complete weld. In this manner the weld may be made upon plates butted together, as shown in Fig. 12, the projections or points of contact being upon the edges of one or both plates. In this case the edges are pressed together, as in the other case, during the welding operation. Alternating or direct current may be used, as desired. Plates or sheets of metal united in this manner may be used as roofing-plates, in the manufacture of sheet-metal cans, boilers, tanks, and hardware generally.

If the transformer T is properly proportioned, the current may be just sufficient to produce the welding operation so long as the two lapped parts of the plates are not fully pressed together, and when this latter takes place by the welding the resistance will be so low that the current loses its power to fuse, and the lapped ends will not be melted off or injured. This will insure the process being automatic and adapted to take care of itself to avoid injury to the plates.

I do not confine myself to the details of construction of the apparatus for carrying my invention into practice, as these may be modified without departing from the spirit of the invention.

What I claim as new, and desire to secure by Letters Patent, is as follows:

1. The method of welding two wide thin flat sheets of metal together to form one continuous sheet which consists of first shaping the end of one or both sheets so as to produce a large number of small projecting portions arranged in line across the sheet or sheets, then overlapping the ends of said sheets so as to bring them in contact alone at a series of small points in the lapped surface of the sheets, then passing a current of electricity simultaneously through all of the series of small points of contact, simultaneously pressing the two sheets together as the metal about the points of contact melts whereby a large series of small fluid portions of metal are formed and gradually increased in area and separated by gradually-decreasing areas of solid or non-fluid portions until the several fluid portions just meet to form a long weld, and then arresting the current to prevent burning off of the ends of the sheets.

2. The herein-described method of electric welding of two wide and thin sheets of metal which consists in placing the two sheets in contact at a large number of small independent points arranged in the line of the weld transversely across the sheets, then passing a current of electricity simultaneously through the series of points of contact and pressing the two sheets together as the welding operation progresses, and continuing the said pressure until the several independent series of welds increase on all sides sufficiently to extend into each other to form one complete and long welded joint.

3. The method of forming a long sheet from two or more sheets of metal, consisting in producing a series of projections upon one of the sheets near its edge, lapping the two sheets so that they make electrical contact through the projections only, passing an electric current through the projections and both sheets, pressing the two sheets together as the weld advances, and finally passing the welded sheets through a pair of rolls to reduce the welded joint to the same thickness as the body of the sheets.

4. The method of forming a long sheet from two or more sheets of metal, consisting in producing a series of projections upon one of the sheets near its edge, lapping the two sheets so that they make electrical contact through the projections only, passing an electric current through the projections and both sheets, pressing the two sheets together as the weld advances, passing the welded sheets through a pair of rolls to reduce the welded joint to the same thickness as the body of the sheets, and subsequently coating the continuous sheet with an outer covering as a protection to the metal forming the body of the sheet.

5. The method of forming a large sheet of metal from two smaller sheets, consisting in overlapping the adjacent ends of the sheets and holding them in contact at a series of points arranged in line across the sheet so that they are in contact for an area greatly less than the extent of surface required to constitute the completed weld, then passing an electric current through all of the portions of the sheets in contact, and as the welding proceeds forcing the two sheets into greater contact to reduce the electrical resistance and to cause the fluid places in the weld to spread toward each other.

6. The herein-described process of welding consisting in generating a current of electricity of uniform voltage and fixed maximum current, supplying this current to a large series of equally-distributed points of contact in multiple between two sheets to be welded of uniform sectional area and resistance throughout so as to offer a sufficient but subdivided resistance to secure the welding effect at a large number of points simultaneously, then pressing the two sheets together as the welding proceeds until the resistance becomes so low that the current will cease to be sufficient in volume to continue the welding after a given extent of weld has been made, whereby the union of the sheets is secured and the destruction of the lapped portions guarded against.

7. The herein-described process of welding consisting in generating a current of electricity of uniform voltage and fixed maximum current, supplying this current to a large series of equally-distributed points of contact in multiple between two sheets to be welded of uniform sectional area and resistance throughout so as to offer a sufficient but subdivided resistance to secure the welding effect at a large number of points simultaneously, then pressing the two sheets together as the welding proceeds until the resistance becomes so low that the current will cease to be sufficient in volume to continue the welding after a given extent of weld has been made, and automatically interrupting the current when the maximum current required is reached, whereby the union of the sheets is secured and the destruction of the lapped portions guarded against.

In testimony of which invention I hereunto set my hand.

R. M. HUNTER.

Witnesses:
   R. M. KELLY,
   JOHN P. KELLY.